(12) United States Patent
Ji

(10) Patent No.: US 7,843,251 B2
(45) Date of Patent: Nov. 30, 2010

(54) HVNMOS/HVPMOS SWITCHED CAPACITOR CHARGE PUMP HAVING IDEAL CHARGE TRANSFER

(75) Inventor: Cang Ji, Kirchheim/Teck-Nabern (DE)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 98 days.

(21) Appl. No.: 12/290,951

(22) Filed: Nov. 5, 2008

(65) Prior Publication Data

US 2010/0097125 A1 Apr. 22, 2010

(30) Foreign Application Priority Data

Oct. 20, 2008 (EP) .................................. 08392013

(51) Int. Cl.
*G05F 1/10* (2006.01)
(52) U.S. Cl. ........................................ 327/536; 327/337
(58) Field of Classification Search ................. 327/530, 327/534, 535, 536, 537, 337; 363/59, 60
See application file for complete search history.

(56) References Cited

U.S. PATENT DOCUMENTS

| 6,400,211 | B1 | 6/2002 | Yokomizo et al. | |
|---|---|---|---|---|
| 6,831,499 | B2 | 12/2004 | Oddone et al. | |
| 6,888,400 | B2 * | 5/2005 | Lin et al. | 327/536 |
| 6,965,263 | B2 * | 11/2005 | Bringivijayaraghavan | 327/537 |
| 6,977,533 | B2 | 12/2005 | Kernhof et al. | |
| 6,995,995 | B2 | 2/2006 | Zeng et al. | |
| 7,123,077 | B2 * | 10/2006 | Chiu et al. | 327/536 |
| 7,224,206 | B2 * | 5/2007 | Pappalardo et al. | 327/536 |
| 7,236,002 | B2 | 6/2007 | Salzmann et al. | |
| 7,276,960 | B2 | 10/2007 | Peschke | |
| 2005/0088220 | A1 | 4/2005 | Hahn et al. | |
| 2006/0006925 | A1 * | 1/2006 | Yamazoe et al. | 327/536 |

FOREIGN PATENT DOCUMENTS

| DE | 08392013.2 - 1242 | 2/2009 |
|---|---|---|
| EP | 1 881 589 | 1/2008 |
| FR | 2759507 | 8/1998 |

OTHER PUBLICATIONS

"A New Charge Pump Without Degradation in Threshold Voltage Due to Body Effect," by Shin et al., IEEE Journal of Solid-State Circuits, vol. 35, No. 8, Aug. 2000, pp. 1227-1230.

* cited by examiner

*Primary Examiner*—Long Nguyen
*Assistant Examiner*—Sibin Chen
(74) *Attorney, Agent, or Firm*—Saile Ackerman LLC; Stephen B. Ackerman

(57) ABSTRACT

An integrated circuit for a charge pump with a charge stage and a pump stage and a single High-Voltage PMOS (HVP-MOS) transistor as the main switch for each stage and two times two minimum HVPMOS transistors in series as a bulk switch with fixed bulk connections, where the minimum HVPMOS transistors are smaller sized transistors than the transistors of the main switch. The bulk of the main switch is switched synchronously to the voltage node of the HVPMOS transistor of the main switch to force the bulk voltage ($V_B$) to be equal or larger than either the source voltage ($V_S$) or the drain voltage ($V_D$). Two non-overlapping clock signals are used to trigger the HVPMOS transistors of the charge and pump stage.

21 Claims, 6 Drawing Sheets

HVNMOS/HVPMOS SWITCHED CAPACITOR CHARGE PUMP HAVING IDEAL CHARGE TRANSFER

BACKGROUND OF THE INVENTION

1. Field of the Invention

The invention relates to an integrated circuit charge pump, and more particularly to a charge pump with a single HVPMOS transistor as a main switch having coupled in parallel to its source and extended drain a bulk switch with fixed bulk connection.

2. Description of the Related Art

Reference is made to *A New Charge Pump Without Degradation in Threshold Voltage Due to Body Effect* by Jongshin Shin, In-Young Chung, Young June Park, and Hong Shick Min in the IEEE Journal of Solid-State Circuits, Vol. 35, No. 8, August 2000.

U.S. Patent Application 2005/0088220 (Hahn et al.) discloses a charge pump circuit which alleviates the body effect of a charge transfer transistor, thereby improving the charge transfer efficiency of the charge transfer transistor. This circuit, however, uses two transistors in series which has the above mentioned problems of a large on-resistance and charge current losses.

U.S. Pat. No. 7,276,960 (Peschke) presents voltage regulated charge pump with regulated charge current where the amount of current depends on the output voltage error. Voltage overshoots are reduced through pulse skipping. The charge pump circuit comprises a flying capacitor coupled to a CMOS driver on the lower plate and diodes on the upper plate.

U.S. Pat. No. 6,995,995 (Zeng et al.) teaches a DC/DC converter where charge pumps operate in two-phase cycles including a charge phase and a pump phase and where the bulk terminal is tied to the source of the switching transistor. Switches are segmented and segments contain a plurality of identical transistors coupled in parallel.

U.S. Pat. No. 6,977,533 (Kernhof et al.) describes a 32V H-Bridge Driver where a charge pump comprises a non-overlapping two-phase clocking scheme where during the pre-charge phase a first capacitor is charged and where during the following shuffle phase this charge is reloaded into a second capacitor. The switches involved are high-voltage N and P CMOS transistors.

U.S. Pat. No. 6,400,211 (Yokomizo et al.) shows another DC/DC converter where a first set of two switches charge a first capacitor during a first phase, and where a second set of switches charges a second capacitor during a second phase, where the second phase is the inverse of the first phase. The input voltage to the DC/DC converter is about 3.6 Volt, typical of a Lithium Ion battery.

U.S. Pat. No. 6,831,499 (Oddone et al.) teaches a Negative Charge Pump which has a plurality of operating phases and stages, each stage comprising of at least two n-channel MOS transistors with bulk regions and parasitic bipolar transistors. The bulk regions are coupled during the operating phases to a potential such that the parasitic bipolar transistors will not turn on.

It should be noted that none of the above-cited examples of the related art provide the advantages of the below described invention.

SUMMARY OF THE INVENTION

It is an object of at least one embodiment of the present invention to provide a method and a circuit to minimize the On-resistance of the main switch of the charge stage and the pump stage of the present invention.

It is another object of the present invention to eliminate dynamic currents flowing through the drain-to-substrate and source-to-substrate of each main switch when it switches ON or OFF.

It is yet another object of the present invention to assure that no current flows through the bulk switches.

These and many other objects have been achieved by coupling a charge stage to a pump stage, where the charge stage charges a first capacitor and where the pump stage charges a second capacitor. Where the charge stage and the pump stage each comprises a HVPMOS transistor main switch on the high voltage side, and where all HVPMOS and HVNMOS transistors have an extended drain.

These and other objects have been furthermore achieved by reducing the main switch from two transistors to one transistor, thereby reducing the chip real estate area and their On-resistance. The dynamic current flow is eliminated by synchronously switching the bulk of the main switch to the higher voltage node (source or drain) of the HVPMOS transistor to assure that the bulk voltage is larger than or equal to the source voltage and larger than or equal to the drain voltage. This increased bias of the bulk of the main switches increases their threshold voltage ($V_T$) and thus avoids a current loss during the charge transfer.

Additionally, the bulk switches for the main switches are arranged in such a way that there is no current flow in the bulk switches when they switch because of the body effect. This is achieved in the following manner:

A first bulk switch is created by coupling two minimum-sized HVPMOS transistors in series, their extended drains coupled to each other, one source and bulk of these minimum-sized HVPMOS transistors coupled to the extended drain of the main switch, and the other source and bulk coupled to the bulk of the main switch.

A second bulk switch is created by coupling two minimum-sized HVPMOS transistors in series, their extended drains coupled to each other, one source and bulk of these minimum-sized HVPMOS transistors coupled to the bulk of the main switch, and the other source and bulk coupled to the source of the main switch.

The gates of the first bulk switch are coupled to the gate of the main switch and receive a clock signal. The gates of the second bulk switch are connected together and receive the NOT (inverse) of that clock signal.

The combination of a low On-resistance, no current flowing through the bulk switches, and no dynamic current flowing through the drain-to-substrate and source-to-substrate creates a HVPMOS switched capacitor charge pump having an ideal charge transfer.

These and many other objects and advantages of the present invention will be readily apparent to one skilled in the art to which the invention pertains from a perusal of the claims, the appended drawings, and the following detailed description of the preferred embodiments.

BRIEF DESCRIPTION OF THE DRAWINGS

Use of the same reference number in different figures indicates similar or like elements.

DESCRIPTION OF THE PREFERRED EMBODIMENT

Previously realized high voltage charge pumps are using two CMOS HVPMOS (High Voltage PMOS) transistors in series as a switch where the bulk of each HVPMOS transistor is connected to its source to avoid turn-on of the parasitic bipolar transistors of each HVPMOS transistor because of the body effect. However, the on-resistance of the switch is large, given by its area W*L of HVPMOS transistors connected series. In addition, there are charge current losses due to dynamic current flowing through the drain to the substrate when $V_B$ is less than $V_D$ ($V_B < V_D$) when the transistor switches on/off.

Figure 1A:
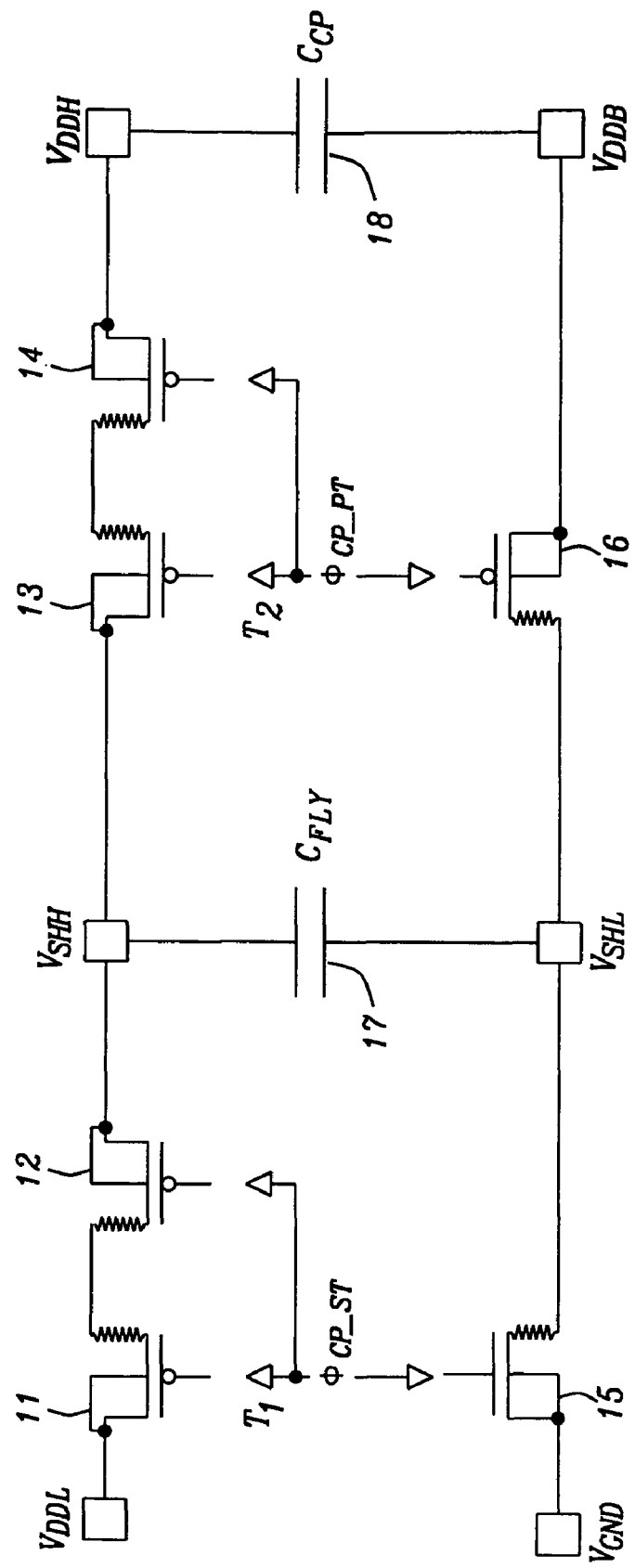
FIG. 1a is a circuit diagram of a charge pump of a technique known to the inventor.

Referring now to FIG. 1a, we describe a charge pump 10 of a technique known to the inventor. HVPMOS transistors 11 and 12 are coupled in series between input $V_{DDL}$ and node $V_{SHH}$. HVPMOS transistors 13 and 14 are coupled in series between node $V_{SHH}$ and output $V_{DDH}$. HVNMOS (High Voltage NMOS) transistor 15 is coupled between input $V_{GND}$ and node $V_{SHL}$, and HVPMOS transistor 16 is coupled between node $V_{SHL}$ and output $V_{DDB}$. Capacitor 17 ($C_{FLY}$) is connected between nodes $V_{SHH}$ and $V_{SHL}$. Capacitor 18 ($C_{CP}$) is connected between outputs $V_{DDH}$ and $V_{DDB}$. The gates of transistors 11, 12, and 15 are coupled to a clock signal T1 ($\Phi_{CP\_ST}$) and the gates of transistors 13, 14, and 16 are coupled to a clock signal T2 ($\Phi_{CP\_PT}$).

Figure 1B:
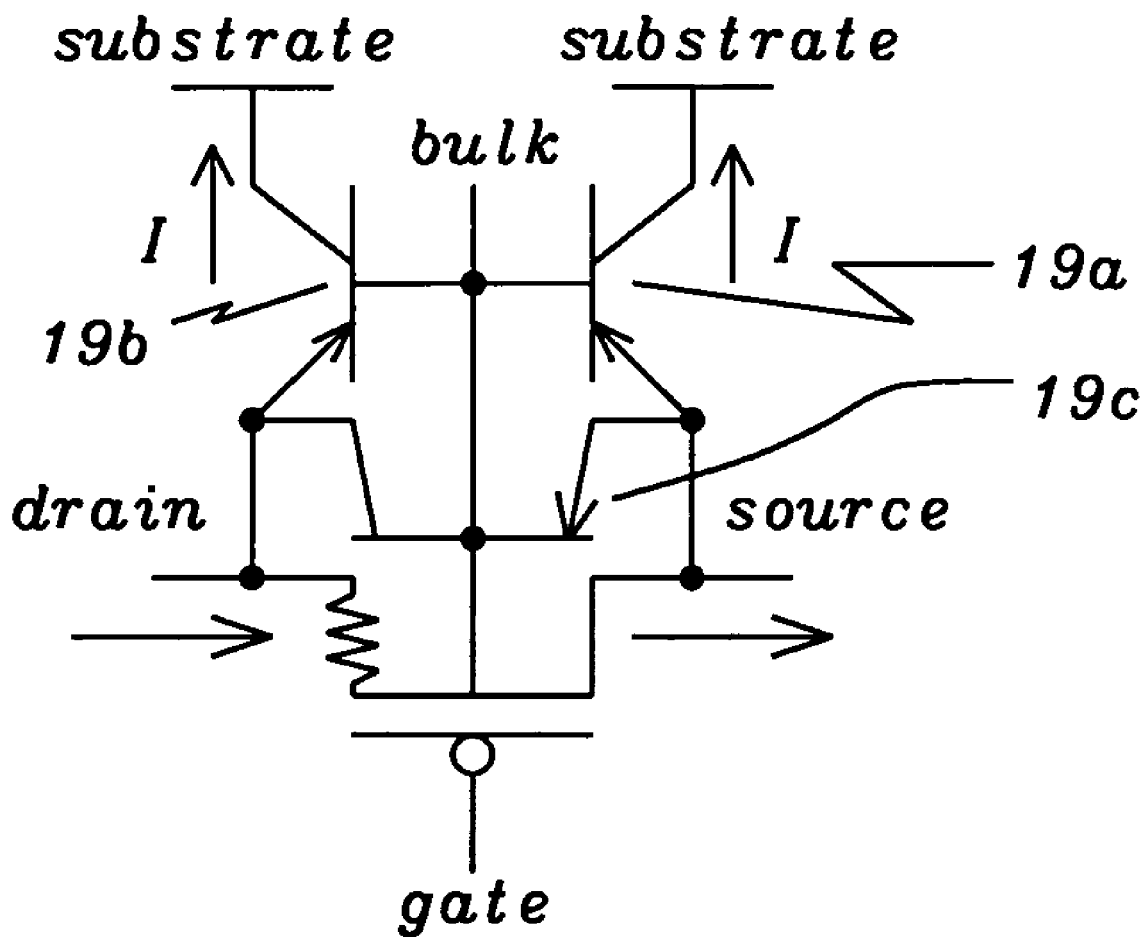
FIG. 1b is a detail of FIG. 1a showing the HVPMOS transistor and its parasitic bipolar transistor.

FIG. 1b is a detail of FIG. 1a showing the parasitic bipolar transistors 19a, 19b, and 19c connected to the drain, source and bulk terminal of HVPMOS transistors 11, 12, 13, and 14. The collectors of transistors 19a and 19b are connected to the substrate of the chip. Current I is shown flowing through each transistor 19a and 19b to the substrate.

$V_{DDL}$ is the linear regulated voltage of 11.7 V derived from $V_{DDB}$=12 V;

$V_{GND}$ is Ground;

$V_{SHH}$ is the plus port of capacitor $C_{FLY}$;

$V_{SHL}$ is the minus port of capacitor $C_{FLY}$;

$V_{DDH}$ is $V_{DDL}+V_{DDB}$;

$V_{DDB}$ is the battery voltage.

Still referring to FIG. 1a, capacitor 17 ($C_{FLY}$) provides the external shuffle capacity and capacitor 18 ($C_{CP}$) provides the external hold capacity. The non-overlapping two-phase clocking scheme driven by clock signals T1 and T2 represents the charge-boosting and charge-hold time, respectively. The output voltage $V_{DDH}$ is charge pumped to $V_{DDL}+V_{DDB}$. Based on the large chip area required by a technique known to the inventor and the charge current losses, an improved charge pump having ideal charge transfer characteristics is needed. The present invention as described below answers these needs.

The HVNMOS/HVPMOS (High Voltage NMOS/High Voltage PMOS) switched capacitor charge pump of the preferred embodiment of the present invention and disclosed below is applicable to CMOS technologies with a high voltage module and intended for supply high-side drivers of, for example, a motor H-bridge. Such a charge pump can be integrated in the technology of: TSMC (Taiwan Semiconductor Manufacturing Co.) 0.35 um Flash-/CMOS process+high voltage module 1. Gox (Gate oxide)=22 nm (same as of Flash/5V-IO part), 2. N-Well/HVP-Well forms a drift zone (extended drain), 3. HVPMOS and HVNMOS with $V_{GS}=V_{BS}<5.5$ V and $V_{DS}<40$ V, 4. no isolated HVNMOS.

Regarding the above mentioned extended drain structure, reference is made to U.S. Pat. No. 7,236,002 (Salzmann et al.) assigned to the assignee of this application, for transistors with extended drain regions for CMOS FET protection switches for both NMOS and PMOS implementations, which is incorporated herein in by reference.

The HVNMOS/HVPMOS switched capacitor charge pump may be integrated in an ASIC (application-specific integrated circuit). It may be used as a voltage supply for the high-side FET drivers of an H-bridge of a motor control (not shown). The charge pump transfers the voltage $V_{DDL}$ ($V_{DDL}$=11.7 V) to $V_{DDH}=V_{DDL}+V_{DDB}$, and supplies high-side FET drivers.

$V_{DDL}$ is the linear regulated voltage of 11.7V from $V_{DDB}$=12 V;

$V_{DDB}$ is the battery voltage;

$V_{SHH}$ is the plus port of capacitor $C_{FLY}$;

$V_{SHL}$ is the minus port of capacitor $C_{FLY}$;

$V_{GND}$ is Ground.

The switched capacitor charge pump of the present invention has a single HVPMOS transistor as the main switch and two minimum-size HVPMOS transistors in series as a bulk switch between the extended drain and bulk of the HVPMOS transistor and another two minimum-size HVPMOS transistors in series as a bulk switch between the bulk and the source of the HVPMOS transistor. The bulk of the HVPMOS transistor is switched synchronously to the higher voltage node of the HVPMOS transistor to produce $V_B>=V_S$ and $V_B>=V_D$ when it switches on/off (i.e. the higher voltage node is the source of the HVPMOS transistor when switched on, the drain of the HVPMOS transistor when switched off).

The area of the main switches (HVPMOS transistors) is reduced significantly, thus minimizing the on-resistance $R_{DS}$.

By way of example the following typical values can be achieved:

When choosing $V_{GS}$=5 V $R_{DS}$ (HVPMOS) about 40Ω with W=4,000 um and Lmin=2.7 um, $R_{DS}$ (HVNMOS) about 20Ω with W=2,000 um and Lmin=2.4 um, the dimensions of each HVPMOS transistor are typically W=1000 um and L=2.7 um, the dimensions the HVNMOS transistor are typically W=2000 um and L=2.4 um, the dimensions of each minimum-size HVPMOS transistor in the bulk switch are typically W=10 um and L=2.7 um.

The area of the four main transistors and the 8 transistors in the bulk switch amounts to: 3×1,000 um×2.7 um+1×2,000 um×2.4 um+8×10 um×2.7 um=0.013 mm², which results in a total resistance of about 140Ω. This compares favorably with an area of approximately 0.09 mm² and a total resistance of approximately 160Ω of a technique known to the inventor.

Because the bulk switches are coupled between the extended drain and source of the HVPMOS transistor no current flows through the bulk switches (I=0) of the switched capacitor charge pump due to the body effect. Furthermore, no dynamic current flows through the drain-to-substrate or source-to-substrate of the main switch because $V_B \geq V_S$ and $V_B \geq V_D$ when it switches on/off. Current peaks (Iswitch_peak) are only flowing through the bulk switches at the moment that the bulk of the main transistor disconnects and connects from drain or source to source or drain ($\Delta V_{BS}$ or $\Delta V_{BD} = V_{DS\_SAT}$).

The peak switch current is defined as: Iswitch_peak=$V_{DS\_SAT}$ (drop voltage of the main transistor)/[$R_{DS\_ON1}+R_{DS\_ON2}$ (on resistances of the two bulk switches in series)] and ranges from about 7.5 uA to 15 uA (7.5×10⁻⁶ to 15×10⁻⁶ A). This current goes to 0 A when the $\Delta V_{BS}$ or $\Delta V_{BD}$=0 (bulk connected to drain or to source).

Current loss is therefore avoided when the charge is transferred from the charge stage to the pump stage. The combination of a minimized on-resistance, no current flowing through the bulk switches, and no dynamic current flows as detailed above creates a HVPMOS switched capacitor charge pump having an ideal charge transfer.

Figure 2:
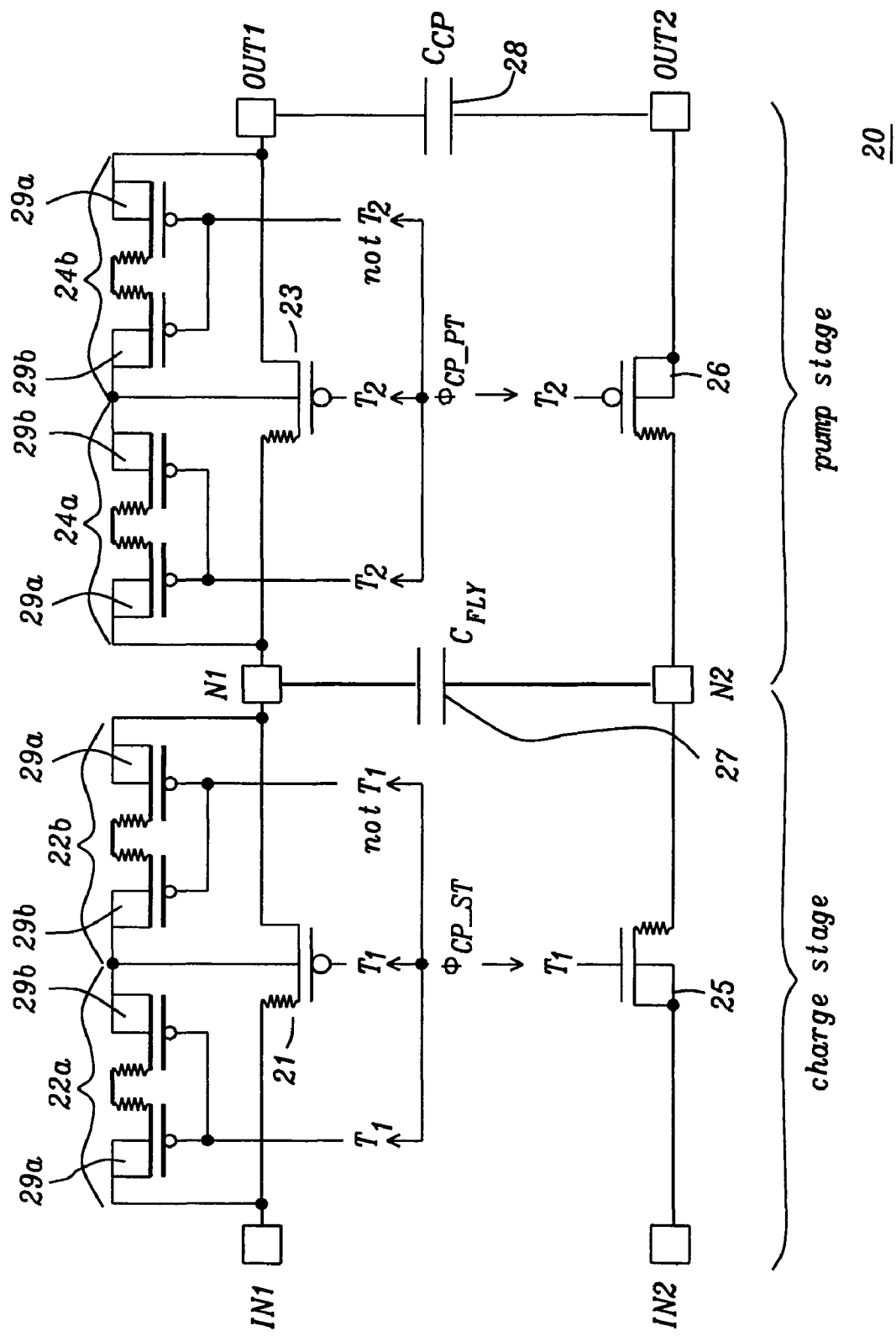
FIG. 2 is a circuit diagram of the bulk-switched charge pump of the preferred embodiment of the present invention.

Referring to FIG. 2, we now describe the bulk-switched charge pump 20 of a preferred embodiment of the present invention which comprises a charge stage coupled to a pump stage. Input IN1 (at potential $V_{DDL}-V_{GND}$) is coupled to the extended drain of HVPMOS transistor 21 and the source of transistor 21 is coupled to node N1 (at potential $V_{SHH}-V_{SHL}$). Input IN2 $V_{GND}$ (at potential ground) is coupled to the source and bulk of HVNMOS transistor 25 and the extended drain of transistor 25 is coupled to node N2 (at potential $V_{SHL}$). Coupled between nodes N1 and N2 is a capacitive means 27 ($C_{FLY}$). Coupled to the extended drain and the bulk of HVPMOS transistor 21 is a minimum HVPMOS circuit 22a, and coupled to the bulk and the source of HVPMOS transistor 21 is a minimum HVPMOS circuit 22b. Each minimum HVPMOS circuit 22a and 22b comprises a minimum HVPMOS transistor 29a and 29b in series with each other. The source and bulk of transistor 29a is coupled to the extended drain of transistor 21, the source and bulk of transistor 29b is coupled to the bulk of transistor 21, and the extended drains of transistors 29a and 29b are coupled together. A signal T1 representing the charging phase $\Phi_{CP\_ST}$ of the charge stage is coupled to the gates of transistors 21 and 25 and the gates of transistors 29a and 29b of minimum HVPMOS circuit 22a. The gates of minimum HVPMOS circuit 22b are coupled to the inverse (NOT) of signal T1. When signal T1 is active, the potential ($V_{DDL}-V_{GND}$) across inputs IN1 and IN2 gets transferred to capacitive means 27 ($C_{FLY}$) because transistors 21 and 25 are conducting; transistors 23 and 26 are OFF.

We next describe the pump stage of FIG. 2. The pump stage has the same structure as the charge stage with the following differences: the extended drain of HVPMOS transistor 23 is coupled to node N1 and the source of transistor 23 is coupled to output OUT1 (at potential $V_{DDH}$), the extended drain of HVPMOS transistor 26 is coupled to node N2 and the source and bulk of transistor 26 is coupled to the output OUT2 (at potential $V_{DDB}$). Minimum HVPMOS circuits 24a and 24b are identical to circuits 22a and 22b, respectively, and so are their connections to transistor 23. A signal T2 representing the charging phase $\Phi_{CP\_PT}$ of the pump stage is coupled to the gates of transistors 23 and 26 and the gates of transistors 29a and 29b of minimum HVPMOS circuit 24a. The gates of minimum HVPMOS circuit 24b are coupled to the inverse (NOT) of signal T2. When signal T2 is active, transistors 23 and 26 are conducting and the charge of capacitor means 27 ($C_{FLY}$) gets transferred to capacitive means 28 ($C_{CP}$) thereby raising its potential, that is the potential ($V_{DDH}-V_{DDB}$) between outputs OUT1 and OUT2. Transistors 21 and 25 are OFF during the charging phase of the pump stage.

Figure 3:
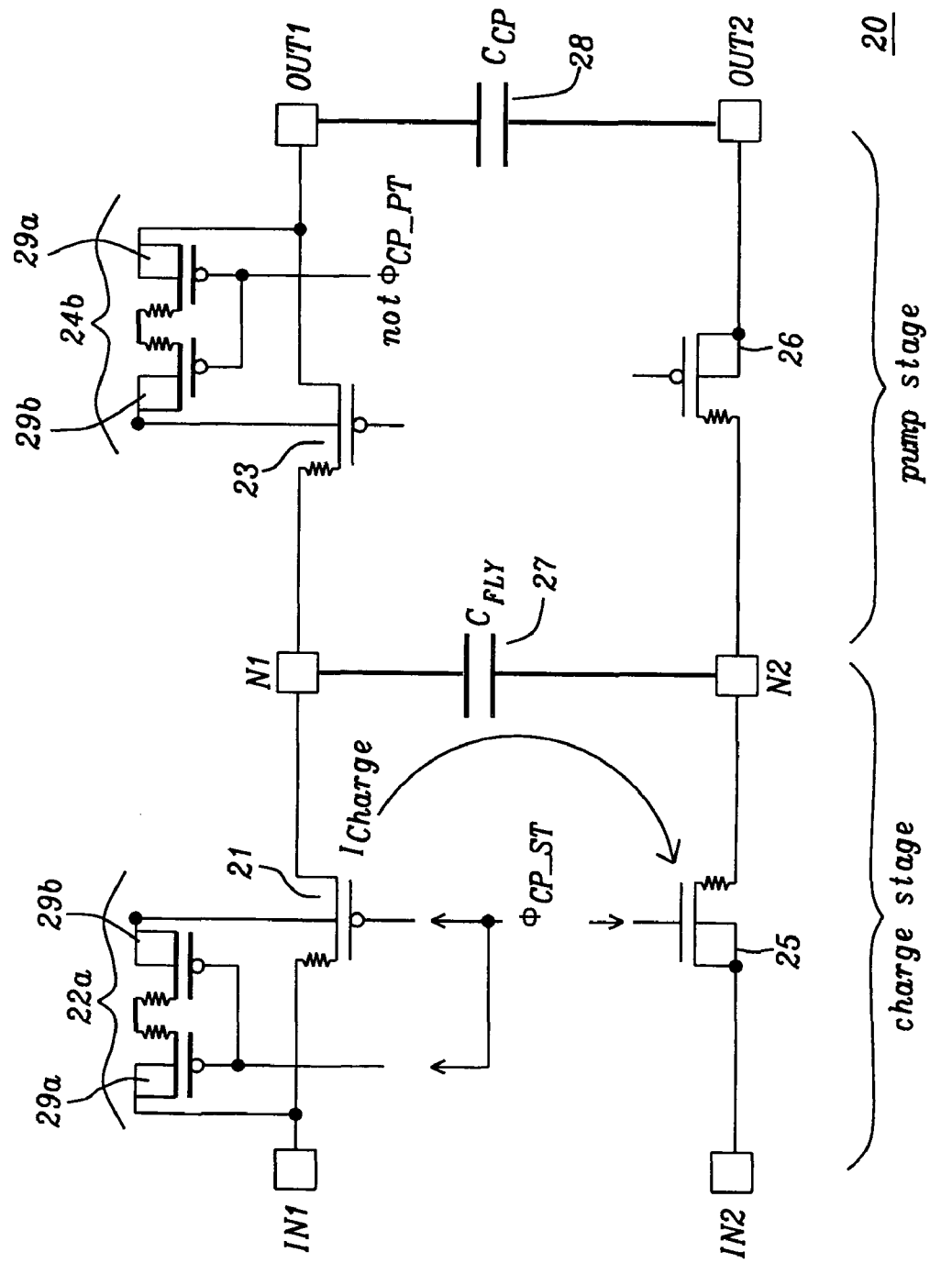
FIG. 3 shows the pre-charging phase of the charge pump of FIG. 2.

Referring to FIG. 3 (a subset of FIG. 2), we now describe the bulk-switched charge pump in the pre-charging phase when $V_{SHH} < V_{DDH}$. When signal T1 is active ($\Phi_{CP\_ST}$), transistors 21, 25, and 29a and 29b of minimum HVPMOS circuit 22a of the charge stage are ON. Also ON are transistors 29a and 29b of minimum HVPMOS circuit 24b of the pump stage. The result is that current $I_{CHARGE}$, as indicated by the arrow $I_{CHARGE}$, charges capacitive means 27 ($C_{FLY}$) via HVPMOS transistor 21 and HVNMOS transistor 25 and that the bulk of transistor 21 is raised to the voltage potential ($V_{DDL}-V_{GND}$) at input IN1. Because the inverse of signal T2 (NOT $\Phi_{CP\_PT}$) is also active, the bulk of HVPMOS transistor 23 of the pump stage is raised to the voltage potential $V_{DDH}$ at output OUT2.

Figure 4:
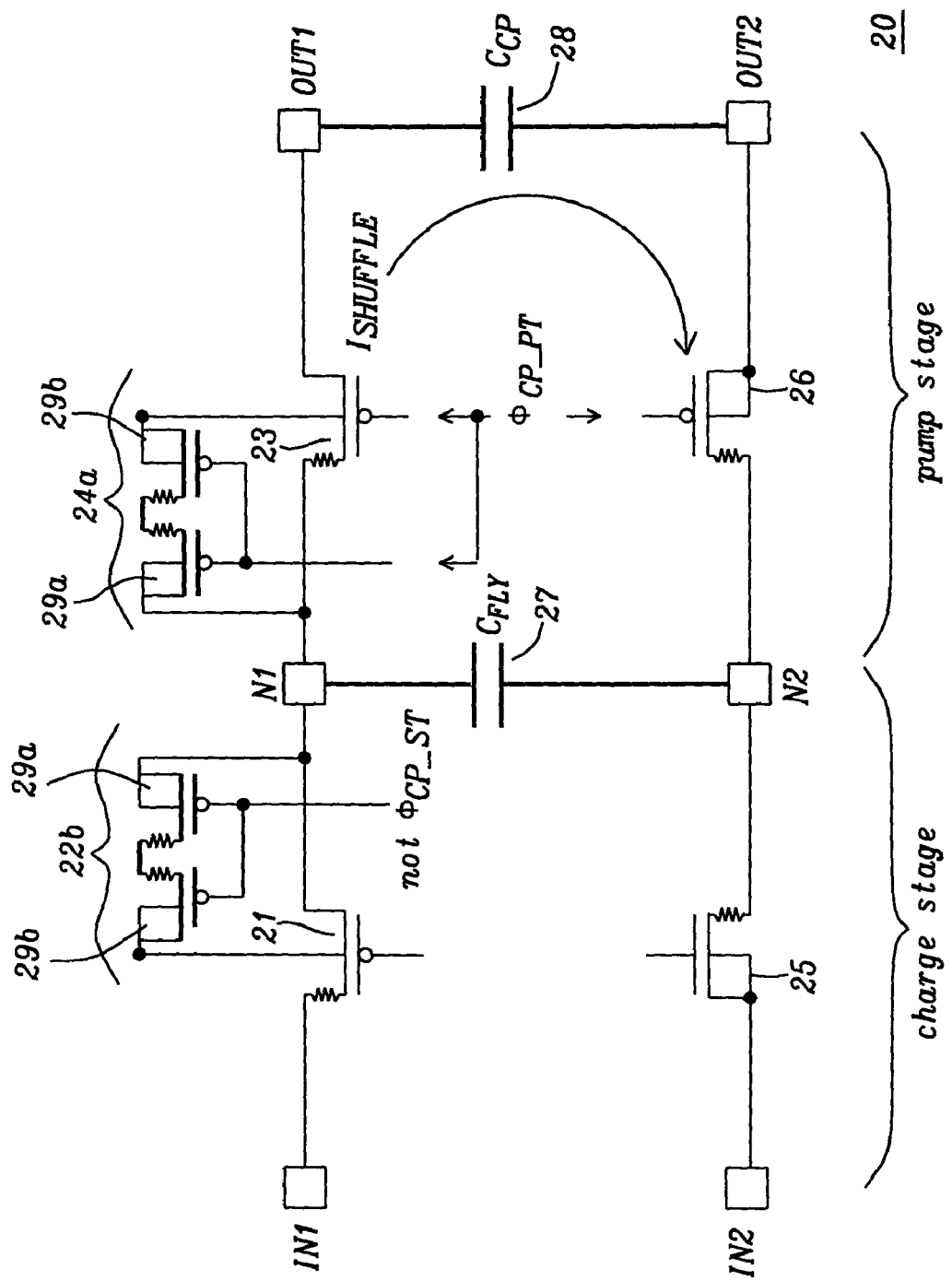
FIG. 4 shows the shuffle phase of the charge pump of FIG. 2.
Figure 5:
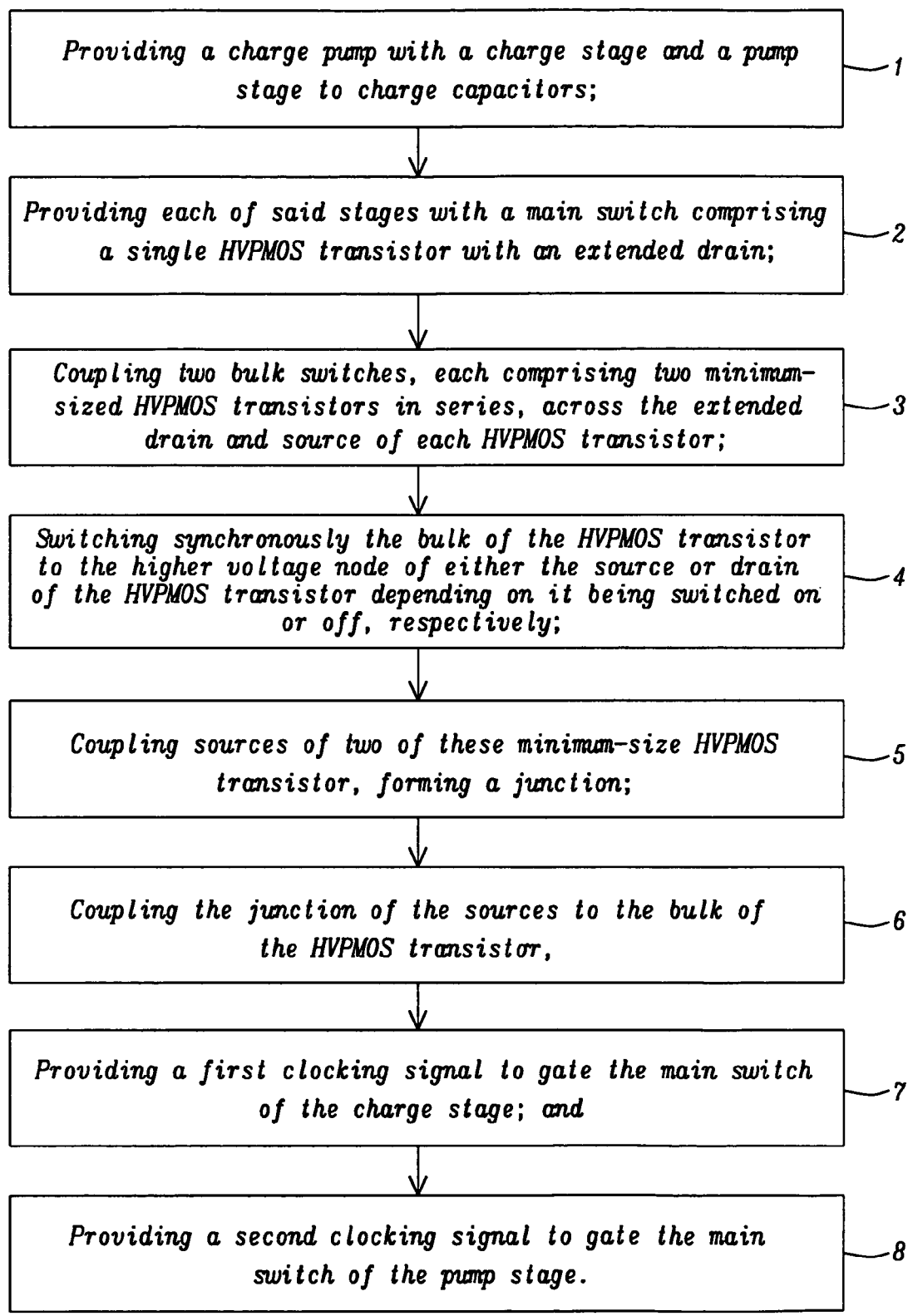
FIG. 5 is a block diagram of the method of the present invention.

Referring to FIG. 4 (a subset of FIG. 2), we next describe the bulk-switched charge pump in the shuffle phase, when $V_{SHH} \geq V_{DDH}$. When signal T2 is active ($\Phi_{CP\_PT}$), transistors 23, 26, and 29a and 29b of minimum HVPMOS circuit 24a of the pump stage are ON. The result is that current $I_{SHUFFLE}$, as indicated by the arrow $I_{SHUFFLE}$, transfers the charge of capacitive means 27 ($C_{FLY}$) to capacitive means 28 ($C_{CP}$) via HVPMOS transistors 23 and 26, thereby raising the voltage potential of capacitive means 28 ($C_{CP}$). Also ON are transistors 29b and 29a of minimum HVPMOS circuit 22b of the charge stage raising at the same time the bulk of transistor 23 is to the, now higher, voltage potential $V_{SHH}$ at node N1. Because the inverse of signal T1 (NOT $\Phi_{CP\_ST}$) is active, the bulk of transistor 21 of the charge stage is also raised to the voltage potential at node N1.

Switching means may imply devices such as a transistor or a transistor circuit, either of these in discrete form or in integrated circuits (IC), a relay, a mechanical switch. These devices are cited by way of illustration and not of limitation, as applied to switching means. Capacitive means may imply internal or external capacitors or integrated or discrete circuits which perform the function of a capacitor such as diode wired transistors and similar structures. These devices are cited by way of illustration and not of limitation, as applied to switching means.

Referring again to FIG. 2, we describe in more detail a preferred embodiment of the present invention of the HVNMOS/HVPMOS switched capacitor charge pump (20), which comprises: a charge stage for charging a first capacitive means (27) and a pump stage for charging a second capacitive means (28), the pump stage coupled to the charge stage for transferring a charge of the first capacitive means (27) to the second capacitive means (28), thereby raising the voltage potential of the second capacitive means (28) to above the voltage potential of the first capacitive means (27), where the charge stage comprises HVPMOS transistor (21) and HVNMOS transistor (25), the HVPMOS transistor (21) of the charge stage coupling a first input of the charge stage to a first terminal of the first capacitive means (27), the HVNMOS transistor (25) of the charge stage coupling a second input of the charge stage to a second terminal of the first capacitive means (27), where gates of the HVPMOS and HVNMOS transistors of the charge stage when clocked by a first signal T1 cause the first capacitive means (27) to be charged, where the pump stage comprises a first and a second HVPMOS transistor, the first HVPMOS transistor (23) of the pump stage coupling the first terminal of the first capacitive means (27) to a first terminal of the second capacitive means (28), the second HVPMOS transistor (26) of the pump stage coupling the second terminal of the first capacitive means (27) to a second terminal of the second capacitive means (28), where gates of the first and the second HVPMOS transistor (26) of the pump stage when clocked by a second signal T2 cause the charge of the first capacitive means (27) to be transferred to the second capacitive means (28), and;

a bulk switch circuit for synchronously switching the bulk of the HVPMOS transistors of the charge stage and the pump stage to the higher voltage node of the HVPMOS transistors, where the higher voltage node is the Source of the HVPMOS transistors when they are switched ON, or the Drain of the HVPMOS transistors when they are switched OFF, the bulk switch circuit comprising a first and a second serially coupled minimum HVPMOS transistor, each minimum HVPMOS transistor having a source, a drain, a gate, and a bulk terminal, where the drains of the first and second minimum HVPMOS transistor are coupled together, where the gates of the first and second minimum HVPMOS transistor are coupled together, and where the bulk terminal of each of the first and second minimum HVPMOS transistor is coupled to its respective source.

The sources of a first bulk switch circuit (22a) are coupled to the drain and the bulk terminal, respectively, of HVPMOS transistor (21) of the charge stage, the sources of a second bulk switch circuit (22b) are coupled to the bulk terminal and the source, respectively, of HVPMOS transistor (21) of the charge stage, the sources of a third bulk switch circuit (24a) are coupled to the drain and the bulk terminal, respectively, of the first HVPMOS transistor (23) of the pump stage, and the sources of a fourth bulk switch circuit (24b) are coupled to the bulk terminal and the source, respectively, of the first HVPMOS transistor (23) of the pump stage.

The drains of the HVPMOS transistors and of HVNMOS transistor (25) and the drains of the minimum HVPMOS transistors are extended drain regions, as referenced in U.S. Patent Application 2005/0088220 (Hahn et al.) above.

The drain of HVPMOS transistor (21) of the charge stage is coupled to the first input of the charge stage and where the source of HVPMOS transistor (21) of the charge stage is coupled to the first terminal of the first capacitive means (27).

The source and bulk terminal of HVNMOS transistor (25) of the charge stage is coupled to the second input of the charge stage and the drain of HVNMOS transistor (25) of the charge stage is coupled to the second terminal of first capacitive means (27).

The drain of the first HVPMOS transistor (23) of the pump stage is coupled to the first terminal of the first capacitive means (27) and the source of the first HVPMOS transistor (23) of the pump stage is coupled to the first terminal of the second capacitive means (28) and a first output.

The drain of the second HVPMOS transistor (26) of the pump stage is coupled to the second terminal of the first capacitive means (27) and the source and bulk terminal of the HVPMOS transistor (21) of the charge stage is coupled to the second terminal of the second capacitive means (28) and a second output.

The gates of the second bulk switch are clocked by the inverse of the first signal T1 and the gates of the fourth bulk switch are clocked by the inverse of the second signal T2.

Simulation runs show given that:

Capacitance $C_{FLY}$=220 nF,

Capacitance $C_{CP}$=470 nF,

Load current $I_{LOAD}$=10 mA, and

Clock frequency f=133 KHz, the following results are achievable:
  When $V_{DDB}$=12 V, output OUT1 will reach a voltage $V_{DDH}$ of about 23.5 Volt in about 1.3 ms.
  When $V_{DDB}$=28 V, output OUT1 will reach a voltage $V_{DDH}$ of about 39.5 Volt in about 1.5 ms.
  When $V_{DDB}$=5 V, output OUT1 will reach a voltage $V_{DDH}$ of about 10.5 Volt in about 1.5 ms.
  Measured runs with the same parameters as above yield:
  When $V_{DDB}$=12 V, output OUT1 will reach a voltage $V_{DDH}$ of about 23.2 Volt in about 1.3 ms.
  When $V_{DDB}$=28 V, output OUT1 will reach a voltage $V_{DDH}$ of about 39.2 Volt in about 1.5 ms.
  When $V_{DDB}$=5 V, output OUT1 will reach a voltage $V_{DDH}$ of about 10.2 Volt in about 1.5 ms.

We now describe the method of the present invention of synchronously switching the bulk of a charge pump:
a) Block 1 provides a charge pump with a charge stage and a pump stage to charge capacitors;
b) Block 2 provides each of said stages with a main switch comprising a single HVPMOS transistor with an extended drain;
c) Block 3 couples a two bulk switches, each comprising two minimum-sized HVPMOS transistors in series, across the extended drain and source of each HVPMOS transistor;
d) Block 4 switches synchronously the bulk of the HVPMOS transistor to the higher voltage node of either the source or the drain of the HVPMOS transistor depending on it being switched on or off, respectively;
e) Block 4-5 coupling sources of two of these minimum-size HVPMOS transistors, forming a junction;
f) Block 6 couples the junction of the sources to the bulk of the HVPMOS transistor;
g) Block 7 provides a first clocking signal to gate the main switch of the charge stage; and
h) Block 8 provides a second clocking signal to gate the main switch of the pump stage.

ADVANTAGES

Advantages of the present invention are:

1. reduced real estate area of the switched capacitor charge pump;

2. reduced on-resistance of the switched capacitor charge pump;

3. no current flow through the bulk switches of the switched capacitor charge pump;

4. no dynamic current flow through the drain-to-substrate of the switched capacitor charge pump;

5. no dynamic current flow through the source-to-substrate of the switched capacitor charge pump.

While the invention has been particularly shown and described with reference to the preferred embodiments thereof, it will be understood by those skilled in the art that various changes in form and details may be made without departing from the spirit and scope of the invention.

What is claimed is:

1. A HVNMOS/HVPMOS switched capacitor charge pump, comprising:

a charge stage for charging a first capacitive means and a pump stage for charging a second capacitive means, said pump stage coupled to said charge stage for transferring a charge of said first capacitive means to said second capacitive means, thereby raising the voltage potential of said second capacitive means to above the voltage potential of said first capacitive means, where a HVPMOS transistor of said charge stage is coupled between a first input of said charge stage and a first terminal of said first capacitive means, and where a HVPMOS transistor of said pump stage is coupled between said first terminal of said first capacitive means and a first terminal of said second capacitive means;

bulk switch circuits for synchronously switching the bulk of said HVPMOS transistors of said charge stage and said pump stage to the higher voltage node of said HVPMOS transistors, where said higher voltage node is a source of said HVPMOS transistors when switched on, or a drain of said HVPMOS transistors when switched off, said bulk switch circuit comprising serially coupled minimum HVPMOS transistors, each said minimum HVPMOS transistor having their drains coupled together, and where a bulk terminal of each of said minimum HVPMOS transistors is coupled to its respective source, where a first of said bulk switch circuits is coupled in parallel to a drain and a bulk terminal of said HVPMOS transistor of said charge stage, where a second of said bulk switch circuits is coupled in parallel to said bulk terminal and a source of said HVPMOS transistor of said charge stage, where a third of said bulk switch circuits is coupled in parallel to a drain and a bulk terminal of said HVPMOS transistor of said pump stage; and where a fourth of said bulk switch circuits is coupled in parallel to said bulk terminal and a source of said HVPMOS transistor of said pump stage.

2. The HVNMOS/HVPMOS switched capacitor charge pump of claim 1, wherein drains of said HVPMOS transistors are extended drain regions.

3. The HVNMOS/HVPMOS switched capacitor charge pump of claim 1, wherein said drains of said minimum HVPMOS transistors are extended drain regions.

4. The HVNMOS/HVPMOS switched capacitor charge pump of claim 1, wherein said drain of said HVPMOS transistor of said charge stage is coupled to said first input of said charge stage and where said source of said HVPMOS transistor of said charge stage is coupled to said first terminal of said first capacitive means.

5. The HVNMOS/HVPMOS switched capacitor charge pump of claim 1, wherein a source and a bulk terminal of an HVNMOS transistor are coupled to a second input of said charge stage and where an extended drain region of said HVNMOS transistor is coupled to a second terminal of said first capacitive means.

6. The HVNMOS/HVPMOS switched capacitor charge pump of claim 1, wherein said drain of said HVPMOS transistor of said pump stage is coupled to said first terminal of said first capacitive means and where said source of said HVPMOS transistor of said pump stage is coupled to said first terminal of said second capacitive means and a first output.

7. The HVNMOS/HVPMOS switched capacitor charge pump of claim 1, wherein an extended drain of a low-side HVPMOS transistor of said pump stage is coupled to said second terminal of said first capacitive means and where a source and a bulk terminal of said low-side HVPMOS transistor of said pump stage are coupled to said second terminal of said second capacitive means and a second output.

8. The HVNMOS/HVPMOS switched capacitor charge pump of claim 1, wherein gates of said first bulk switch, said HVPMOS, and said HVNMOS transistor of said charge stage are clocked by a first signal (T1).

9. The HVNMOS/HVPMOS switched capacitor charge pump of claim 8, wherein gates of said second bulk switch are clocked by the inverse of said first signal (T1).

10. The HVNMOS/HVPMOS switched capacitor charge pump of claim 1, wherein gates of said third bulk switch, said HVPMOS, and said low-side HVPMOS transistor of said pump stage are clocked by a second signal (T2).

11. The HVNMOS/HVPMOS switched capacitor charge pump of claim 10, wherein gates of said fourth bulk switch are clocked by the inverse of said second signal (T2).

12. A HVNMOS/HVPMOS switched capacitor charge pump, comprising:

a charge stage for charging a first capacitive means and a pump stage for charging a second capacitive means, said pump stage coupled to said charge stage for transferring a charge of said first capacitive means to said second capacitive means, thereby raising the voltage potential of said second capacitive means to above the voltage potential of said first capacitive means, where said charge stage comprises a HVPMOS transistor and a HVNMOS transistor, said HVPMOS transistor of said charge stage coupling a first input of said charge stage to a first terminal of said first capacitive means, said HVNMOS transistor of said charge stage coupling a second input of said charge stage to a second terminal of said first capacitive means, where gates of said HVPMOS and HVNMOS transistors of said charge stage when clocked by a first signal (T1) cause said first capacitive means to be charged, where said pump stage comprises a first and a second HVPMOS transistor, said first HVPMOS transistor of said pump stage coupling said first terminal of said first capacitive means to a first terminal of said second capacitive means, said second HVPMOS transistor of said pump stage coupling said second terminal of said first capacitive means to a second terminal of said second capacitive means, where gates of said first and said second HVPMOS transistor of said pump stage when clocked by a second signal (T2) cause a charge of said first capacitive means to be transferred to said second capacitive means, and;

bulk switch circuits for synchronously switching the bulk of said HVPMOS transistors of said charge stage and said pump stage to the higher voltage node of said HVPMOS transistors, where said higher voltage node is a source of said HVPMOS transistors when switched on, or a drain of said HVPMOS transistors when switched off, said bulk switch circuit comprising a first and a second serially coupled minimum HVPMOS transistor, each said minimum HVPMOS transistor having a source, a drain, a gate, and a bulk terminal, where said drains of said first and second minimum HVPMOS transistor are coupled together, where said gates of said first and second minimum HVPMOS transistor are coupled together, and where said bulk terminal of each of said first and second minimum HVPMOS transistor is coupled to its respective said source, where said sources of a first of said bulk switch circuits are coupled to said drain and said bulk terminal, respectively, of said HVPMOS transistor of said charge stage, where said sources of a second of said bulk switch circuits are coupled to said bulk terminal and said source, respectively, of said HVPMOS transistor of said charge stage, where said sources of a third of said bulk switch circuits are coupled to said drain and said bulk terminal, respectively, of said first HVPMOS transistor of said pump stage, and where said sources of a fourth of said bulk switch circuits are coupled to said bulk terminal and said source, respectively, of said first HVPMOS transistor of said pump stage.

13. The HVNMOS/HVPMOS switched capacitor charge pump of claim 12, wherein said drains of said HVPMOS transistors and of said HVNMOS transistor are extended drain regions.

14. The HVNMOS/HVPMOS switched capacitor charge pump of claim 12, wherein said drains of said minimum HVPMOS transistors are extended drain regions.

15. The HVNMOS/HVPMOS switched capacitor charge pump of claim 12, wherein said drain of said HVPMOS transistor of said charge stage is coupled to said first input of said charge stage and where said source of said HVPMOS transistor of said charge stage is coupled to said first terminal of said first capacitive means.

16. The HVNMOS/HVPMOS switched capacitor charge pump of claim 12, wherein said source and a bulk terminal of said HVNMOS transistor of said charge stage is coupled to said second input of said charge stage and where said drain of said HVNMOS transistor of said charge stage is coupled to said second terminal of said first capacitive means.

17. The HVNMOS/HVPMOS switched capacitor charge pump of claim 12, wherein said drain of said first HVPMOS transistor of said pump stage is coupled to said first terminal of said first capacitive means and where said source of said first HVPMOS transistor of said pump stage is coupled to said first terminal of said second capacitive means and a first output.

18. The HVNMOS/HVPMOS switched capacitor charge pump of claim 12, wherein said drain of said second HVPMOS transistor of said pump stage is coupled to said second terminal of said first capacitive means and where said source and a bulk terminal of said HVPMOS transistor of said charge stage is coupled to said second terminal of said second capacitive means and a second output.

19. The HVNMOS/HVPMOS switched capacitor charge pump of claim 12, wherein said gates of said second bulk switch are clocked by the inverse of said first signal (T1).

20. The HVNMOS/HVPMOS switched capacitor charge pump of claim 12, wherein said gates of said fourth bulk switch are clocked by the inverse of said second signal (T2).

21. A method of synchronously switching the bulk of a charge pump, comprising the steps of:
 a) providing a charge pump with a charge stage and a pump stage to charge capacitors;
 b) providing each of said stages with a main switch comprising a single HVPMOS transistor with an extended drain;
 c) coupling two bulk switches, each comprising two minimum-sized HVPMOS transistors in series, across the extended drain and source of each HVPMOS transistor;
 d) switching synchronously the bulk of the HVPMOS transistor to the higher voltage node of either the source or the drain of the HVPMOS transistor depending on it being switched on or off, respectively;
 e) coupling sources of two of these minimum-size HVPMOS transistors, forming a junction;
 f) coupling the junction of the sources to the bulk of the HVPMOS transistor;
 g) providing a first clocking signal to gate the main switch of the charge stage; and
 h) providing a second clocking signal to gate the main switch of the pump stage.

* * * * *